F. PÜTZ.
MICROSCOPE.
APPLICATION FILED JULY 22, 1914.
1,117,242.
Patented Nov. 17, 1914.
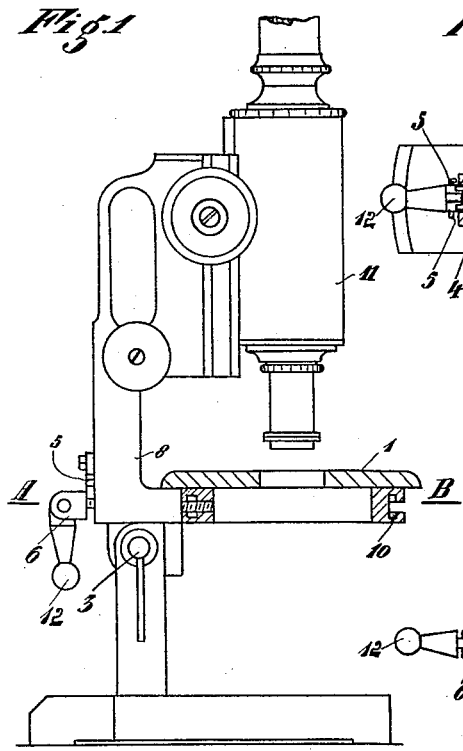
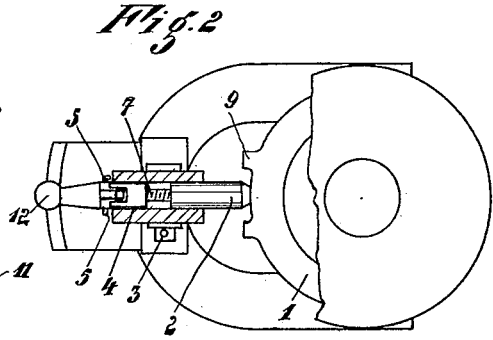
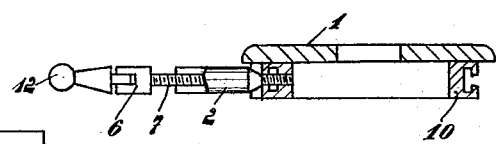
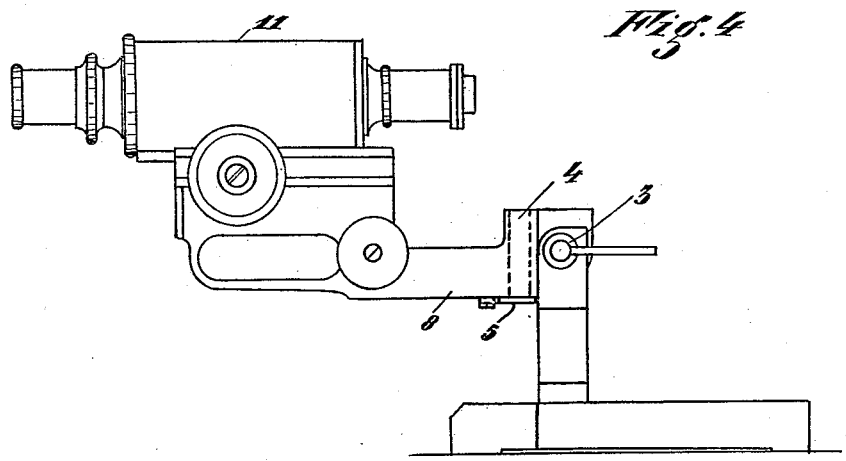
Witnesses:
Jean Kukmann
Hubert Hannig
Inventor:
Ferdinand Pütz

UNITED STATES PATENT OFFICE.

FERDINAND PÜTZ, OF CASSEL, GERMANY.

MICROSCOPE.

1,117,242.  Specification of Letters Patent.  Patented Nov. 17, 1914.

Application filed July 22, 1914. Serial No. 852,462.

*To all whom it may concern:*

Be it known that I, FERDINAND PÜTZ, a subject of the German Emperor, and residing at Cassel, Germany, have invented certain new and useful Improvements in Microscopes, of which the following is a specification.

The present invention has reference to improvements in microscopes, and has for its object a microscope whose object table or stage can readily be removed from the stand proper for demonstrating and other purposes, but which stage, when affixed to the stand, is securely locked against displace in any direction.

With this object in view the invention essentially consists of the construction, arrangement and coöperation of parts, as will now be described with reference to the accompanying drawings, in which—

Figure 1 shows a side elevation of a microscope, with the removable stage partly in section; Fig. 2 represents a horizontal section on line A—B of Fig. 1 showing the stage in an extended position; Fig. 3 shows a vertical section through the stage and securing means; Fig. 4 shows a side elevation of the instrument laid over, with the stage removed; and Fig. 5 shows the retaining catch 5.

From the stage 1 extends laterally a round or prismatic supporting arm 2, whose free end is internally threaded and receives the screw bolt 7, the head 6 of which conveniently journals a drop handle 12. The upstanding pillar 8 of the stand is provided above its hinge 3 with a horizontal bore 4, extending clear through and corresponding in cross-section to that of the support arm 2. The latter, with the jointed handle 12 in alinement, is inserted into the bore, the headed screw bolt 7 is adjusted to securely clamp the pillar between this clamp and the stage proper, and is secured in the position of use by a hook-shaped catch 5 which engages behind the screw bolt head 6, as shown in Figs. 1 and 5. Rotary displacement of the stage about the axis of its support 2 is prevented by means of extensions 9 on the stage (Fig. 2) adapted to closely hug between them the arm 8. In case the support 2 and the corresponding pillar bore 4 are of prismatic cross-section, obviously, such special means for preventing rotation of the stage about its axis of support are superfluous.

It is oftentimes desirable to hand the detached stage around to a number of students, in which case often a magnifying glass, holding forceps, spring clamps, or the like are to be temporarily attached to the stage. For this purpose the latter may be provided with a circumferential, suitably profiled groove 10 in which the respective instruments are suitably secured. The stage could then be used for ordinary demonstrating purposes, independently of its main purpose. After the table has been detached, the instrument can be used as projection microscope, by tilting it about its hinge 3, the tube 11 then extending horizontally.

What I claim and desire to secure by Letters Patent is:—

A microscope stand having a bore extending therethrough, a pivoted catch secured to the stand adjacent the mouth of the bore, a supporting member extending through the bore, a stage positioned on the supporting member, a screw bolt coöperating with one end of the supporting member, shoulders on the screw bolt, and a handle carried by the screw bolt for moving the shoulders into engagement with the catch.

In testimony whereof I affix my signature in presence of two witnesses.

FERDINAND PÜTZ.

Witnesses:
JEAN KERKMANN,
HUBERT HANNIG.

Copies of this patent may be obtained for five cents each, by addressing the "Commissioner of Patents, Washington, D. C."